Nov. 13, 1956  M. W. McNAMARA  2,770,088
DUMPING HOPPER FOR LAWN MOWERS AND THE LIKE
Filed July 27, 1954

INVENTOR
MARTIN W. M⁴ NAMARA
BY Chapin & Neal
ATTORNEYS

2,770,088

DUMPING HOPPER FOR LAWN MOWERS AND THE LIKE

Martin W. McNamara, Pittsfield, Mass., assignor of one-half to Martin W. McNamara, Jr., Chicago, Ill.

Application July 27, 1954, Serial No. 445,989

5 Claims. (Cl. 56—200)

This invention relates to an improved grass or debris catcher or hopper for lawn mowers, lawn sweepers and the like. More particularly it relates to devices of the above class having means for dumping or discharging the accumulated material from the hopper.

The type of discharge hopper to which the invention pertains, characteristically includes a lower frame in which a floor member is freely pivoted for downward and rearward tilting movement when the hopper is raised, the hopper being raised by tilting the machine and its handle, to which the hopper is attached, forwardly to thereby lift the hopper from the ground.

It is the principal object of the present invention to provide a device of the above character which may be releasably, semi-permanently or permanently, attached to a mower or sweeper, rearwardly thereof, and from which the material may be discharged at the will of the operator without tipping the handle of the mower or sweeper upwardly and forwardly, and which may be actuated by the operator without moving from his normal position at the control or propelling handle of the mower or sweeper.

A further object is to provide a structure having means to effect the discharge or dumping of the material by a pulling or pushing movement in line with the direction of travel of the mower or sweeper.

A further object is to increase the area of the opening through which the material is discharged over that available in previous constructions.

Other and further objects residing in the details of structure and their arrangement will be made apparent in the disclosure of the accompanying drawing and in the following specification and claims.

In the accompanying drawings.

Figure 1:
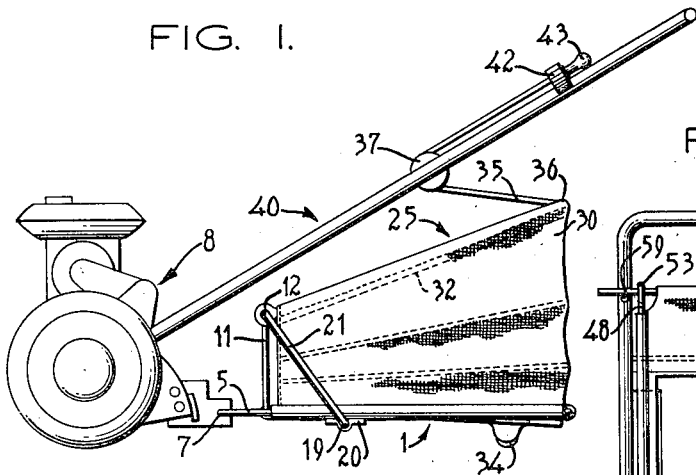
Fig. 1 is a side elevational view showing a hopper, embodying the invention, attached to a conventional power lawn mower.
Figure 2:
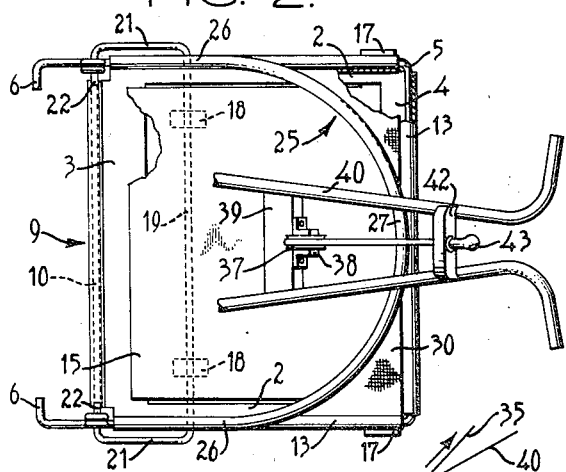
Fig. 2 is a plan view of the hopper structure shown in Fig. 1.
Figures 3, 4:
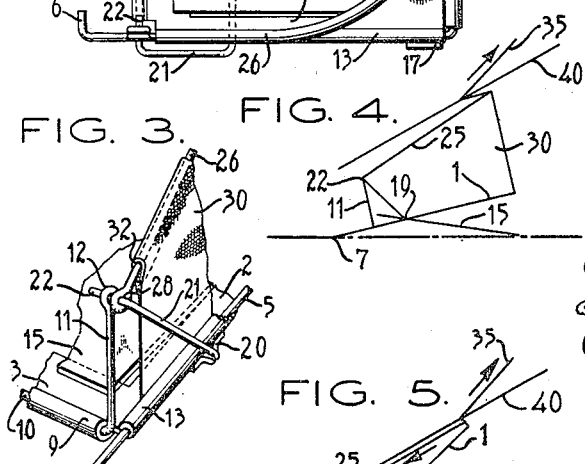
Fig. 3 is a fragmentary detail view showing the manner of connecting certain of the hopper elements.
Figs. 4 and 5 are diagrammatic views showing the manner in which the hopper operates.

Referring to Figs. 1, 2 and 3 the hopper is shown as comprising a lower frame, generally indicated at 1, having side members 2 and forward and rear cross members 3 and 4 respectively. The frame 1 may be formed of relatively light sheet metal and the outer edge portions of the members 2 and 4 are bent, as indicated at 13, around the sides and rear cross portion of a U-shaped member 5 formed of rod-stock or heavy wire. The free forward ends of member 5 are extending beyond the frame 1 and bent inwardly as at 6 to provide spring hooks by which the frame may be pivotally connected as indicated at 7 to the rear portion of the frame of a conventional lawn mower generally indicated at 8.

The forward edge portion of cross member 3 is bent, as indicated at 9, around a rod 10, the end portions of which are bent upwardly to form posts 11 which terminate in eyes 12. As later more fully described posts 11 form lever arms by which frame 1 may be tilted upwardly about the pivotal connection 7.

A floor member 15 formed of sheet metal is pivotally mounted to swing freely within the open frame 1. The forward edge portion of the floor member 15 overlaps member 3 while the rear end portion extends beneath member 4, and the floor member is formed with side extensions 17 which extend beneath the side member 2 rearwardly of the pivotal connection of the floor member to the frame. The floor member 15 is pivoted, forwardly of its center of gravity as by straps 18, to a cross rod 19 which is supported in brackets 20 secured to the underside of the frame members 2. The end portions of rod 19 are bent upwardly and forwardly to form links 21 which terminate in inwardly bent hooks or pintles 22 which respectively extend through the eyes 12 of adjacent posts 11.

The hopper further comprises an upper U-shaped frame member, generally indicated at 25, having forwardly extending side arms 26 connected by a rear portion 27, the free ends of the arms 26 terminating in eyes 28 through which pintles 22 extend, thus pivoting the frame 25 to the posts 11. The side and rear members of frames 1 and 25 are connected by a sheet 30 of canvas or other flexible material, which forms the side and rear walls of the hopper. The lower edge of sheet 30 is secured in any suitable way to frame 1 as by clamping the edge beneath the in-turned edge portions 13 of the frame members 2 and 4, the upper edge of sheet 30 being secured to frame 25 by a loop hem as indicated at 32.

Preferably the floor member 15 is provided on its under side with a supporting roll or rollers indicated at 34 by which the rear end of the hopper is supported.

A rope or cord 35 is secured at one end to the rear portion of the upper hopper frame as indicated at 36. The cord 35 passes around a pulley 37 rotatably mounted in brackets 38 fixed to a cross member 39 of the mower handle 40. From pulley 37 the cord 35 passes rearwardly through a second cross member 42 of the mower handle, the cord 35 terminating in a hand grip 43. The length of cord 35 is such that when the parts are in normal position as shown in Fig. 1 the cord 35, by the engagement of the hand grip 43 with cross member 42, supports the upper frame member of the hopper in operative position as shown in the latter figure.

Figure 5:
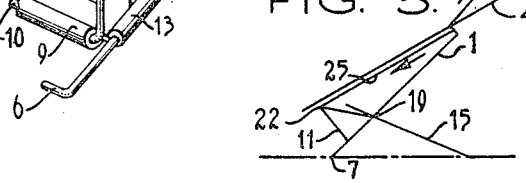

When it is desired to dump the contents of the hopper it is only necessary to pull on the hand grip 43, drawing the cord 35 around the pulley 37 and bringing the upper frame member into contact or proximity to the mower handle as indicated in Fig. 4, thus raising the lower frame of the hopper about the pivotal connection 7 and permitting the floor member 15 to swing downwardly about its pivot. Further pulling of cord 35 forces the upper frame member forwardly along the underside of the mower handle, the upper frame pivoting around pivots 22, further tilting the lower frame member, as shown in Fig. 5, and causing the flexible walls of the hopper to collapse as shown in the latter figure.

As will be apparent the collapse of the walls of the hopper is effected by the forward thrust of the side arms 26 of the upper hopper frame against the upper ends of lever arms 11 which provide leverage to tilt the lower frame upwardly about the pivotal connection 7 of the lower frame to the machine 8, the pivotal connection of the arms 26 to the lever arms 11, permitting the lower frame to swing into proximity to the upper frame. While posts 11 have been described as fixed to the lower frame the tilting strain is in part taken by links 21 which with posts 11 and the intervening portions of side member 2 form a triangle which is a stable structural form, the triangle forming the lever arm. As will be apparent a substantially complete opening of the hopper is obtained with a substantial increase in the angle of inclination of the floor.

Figure 6:
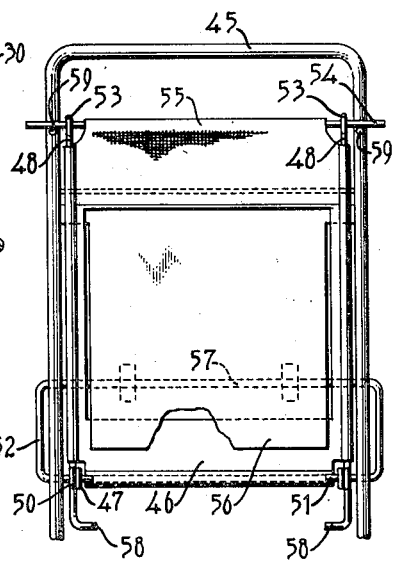
Fig. 6 is a plan view showing a modified form of hopper adapted for use with a lawn sweeper.

In Fig. 6 the hopper structure of Fig. 2 is shown adapted to the conventional U-shaped handle 45 of a lawn sweeper. As there shown, the lower frame member may conform to the structure above described, the lower frame member includes a forward transverse member 46 and upwardly extending lever arm posts having eyes 47 which correspond in form and function to member 4 and posts 11 previously described. The upper frame member is shown as comprising side members 48 having their forward ends provided with eyes 50 through which pintles 51 formed on links 52, similar in all respects to the pintles 22 and links 21 previously described. The rear ends of side members 48 are provided with eyes 53 through which are threaded a cross bar 54 resting on the side members of the sweeper handle and to which the rear flexible wall 55 of the hopper is secured. Bar 54 is normally held in position by short pins 59 extending upwardly from the handle. The tilting floor member 56, corresponding to floor member 15, is pivoted to a cross rod 57 having its end portions upwardly and forwardly bent to form the link members 52. The side members of the lower frame are provided with hooks 58, by which the hopper is pivotally attached to the sweeper frame, not shown, in the same manner as the hopper of Fig. 1 is connected at 7 to the mower 8. To dump the hopper of Fig. 6, bar 54 is raised clear of the pins 55 and pushed forwardly applying forward pressure to eyes 47 causing the lower frame member to tilt upwardly to collapse the walls of the hopper as the floor member is tilted downwardly and rearwardly in essentially the same manner as indicated in Fig. 5.

Figure 7:
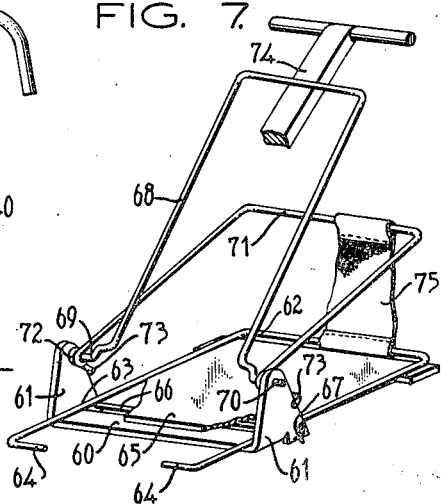
Fig. 7 is a perspective view showing an alternative structure.

In the form shown in Fig. 7 the lower frame is shown as comprising a forward transverse sheet metal member 60, the end portions of which are bent up to form lever arms 61. The rear portion of the frame is formed by a U-shaped member 62 formed of rod-stock or heavy wire, the sides of member 62 being welded or otherwise secured to member 60 as indicated at 63 and terminating in hooks 64 by which the frame is attached to the machine to be served as previously described. The floor member 65 is pivoted for tilting movement within the frame by a rod 66 welded or otherwise secured to the floor member and journaled in openings 67 formed in members 61. A U-shaped member 68 formed of rod-stock has its forward ends bent outwardly as at 69 and pivotally engaged in openings 70 formed in members 61. The upper hopper frame 71, U-shaped in form, is formed of relatively light spring rod-stock or wire, the ends of frame 71 being pivoted to the outwardly bent portions 69 of member 68 by being coiled around the portions 69, as indicated at 72, the extreme end portions being bent outwardly as at 73 to engage the edge of adjacent member 61 to normally retain frame 71 in the relative position shown in Fig. 7. The frames 62 and 71 are connected by flexible walls as indicated at 75.

In operation the hopper of Fig. 7 is attached to the machine to be served by means of hooks 64 with member 68 resting on the handle 74 of the machine. When it is desired to dump the hopper the operator pushes member 68 forwardly thus imposing forward pressure on the lever arms 61 causing the frame 60—62 to tilt upwardly, about the connection of hooks 64 to the machine, bringing frame 71 into engagement with the lower side of handle 74. Continued forward movement of lever arms 61 causes frame 71 to pivot about its pivotal connection to arms 61 at 69, frame 62 swinging into proximity to frame 71, collapsing the walls 75 to complete the opening of the hopper.

As will be understood, and as is apparent from the illustrative embodiments described the frames may be variously constructed, and the pivoting of the floor in the lower frame accomplished in any suitable way, the essential features being that the lower frame be provided with lever arms by which the lower frame may be tilted about its connection to the machine, that the upper and lower frames be connected by flexible collapsible walls and that the upper frame be pivoted with respect to the lower frame so that the latter may be swung into proximity to the upper frame.

What is claimed is:

1. In a discharging hopper of the type having a lower frame in which a floor member is freely pivoted for downward and rearward tilting movement when the frame member is raised and having means for pivotally connecting the forward end of the frame to the rear of a lawn mower and similar machines having a handle extending rearwardly over the hopper; upwardly extending lever arms secured to the sides of said frame and forming means by which the latter may be tilted upwardly about the pivotal connection of the frame to said machine, an upper frame connected to said lower frame by collapsible walls, said upper frame being connected at its forward end to the forward end of the lower frame for pivotal movement relative thereto to thereby permit the lower frame member to swing into close proximity to the upper frame member and collapse the flexible walls upon the application of forward tilting pressure on the lever arms.

2. In a discharging hopper as recited in claim 1, means supported by the handle of the machine for exerting forward tilting pressure on said lever arms.

3. In a discharging hopper as recited in claim 1, in which the pivotal connection between the frames is at the upper end of said lever arms whereby frame tilting pressure may be exerted on said lever arms by forward movement of the upper frame.

4. In a discharging hopper as recited in claim 1, means for connecting the upper frame to the handle of the machine to normally support the upper frame in predetermined relation to the handle.

5. In a discharging hopper of the type having a lower frame in which a floor member is freely pivoted for downward and rearward tilting movement when the frame is raised, the forward end of the frame being provided with means for pivotally connecting it to the rear of a lawn mower or similar machine having a handle extending rearwardly over the hopper; upwardly extending lever arms secured to the sides of said frame and forming means by which the frame may be tilted upwardly about said pivotal connection of the frame to the machine, an upper frame pivotally connected at its forward end to the upper end of said lever arms, flexible collapsible walls connecting the side and rear portions of the upper and lower frames, a pulley mounted on the machine handle forwardly of the rear end of the hopper, and a cord connected to the rear of the upper frame and providing means to draw the upper frame forwardly to exert forward pressure on said lever arms to tilt the lower frame upwardly to collapse the flexible side walls and bring the rear end of the lower frame into proximity to the rear end of the upper frame and permit the floor member to tilt downwardly.

References Cited in the file of this patent
UNITED STATES PATENTS

| | | |
|---|---|---|
| 412,970 | Miller | Oct. 15, 1889 |
| 2,300,934 | Kircher | Nov. 3, 1942 |
| 2,579,103 | Whittaker | Dec. 18, 1951 |
| 2,595,420 | Smola | May 6, 1952 |